United States Patent
Yuzaki et al.

(10) Patent No.: US 8,037,864 B2
(45) Date of Patent: Oct. 18, 2011

(54) DIESEL ENGINE

(75) Inventors: Keiichiro Yuzaki, Osaka (JP);
Tomohiro Ootani, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 235 days.

(21) Appl. No.: 12/529,863

(22) PCT Filed: Mar. 4, 2008

(86) PCT No.: PCT/JP2008/053805
§ 371 (c)(1),
(2), (4) Date: Sep. 3, 2009

(87) PCT Pub. No.: WO2008/108348
PCT Pub. Date: Sep. 12, 2008

(65) Prior Publication Data
US 2010/0108025 A1    May 6, 2010

(30) Foreign Application Priority Data
Mar. 5, 2007  (JP) .................... 2007-054777

(51) Int. Cl.
*F02B 3/12*    (2006.01)
(52) U.S. Cl. ........ 123/299; 123/305; 123/456; 123/685; 123/686; 123/689
(58) Field of Classification Search .................. 123/299, 123/305, 456, 685, 686, 689
See application file for complete search history.

(56) References Cited

U.S. PATENT DOCUMENTS

| | | | | |
|---|---|---|---|---|
| 6,032,642 | A * | 3/2000 | Trumbower et al. | 123/299 |
| 6,390,058 | B1 * | 5/2002 | Takahashi et al. | 123/299 |
| 6,584,953 | B2 * | 7/2003 | Yomogida | 123/300 |
| 6,848,414 | B2 * | 2/2005 | West et al. | 123/299 |
| 7,143,740 | B2 * | 12/2006 | Shirakawa | 123/299 |
| 7,219,650 | B2 * | 5/2007 | Nagano et al. | 123/299 |
| 7,240,660 | B1 * | 7/2007 | Bryant et al. | 123/299 |

(Continued)

FOREIGN PATENT DOCUMENTS

JP        10-122022        5/1998

(Continued)

OTHER PUBLICATIONS

International Search Report for International Application No. PCT/JP2008/053805 dated Mar. 21, 2008, 2 pgs.

*Primary Examiner* — Erick Solis
(74) *Attorney, Agent, or Firm* — Sterne, Kessler, Goldstein & Fox P.L.L.C.

(57) ABSTRACT

In a diesel engine 10 equipped with a fuel injection device 50 having a fuel supply pump 53 for pressingly sending a fuel, a common rail 52 for accumulating the fuel pressingly sent from the fuel supply pump, injectors 51 for injecting the fuel into a cylinder by an electronic control, a coolant water temperature sensor 64 for detecting an engine coolant water temperature and a fuel injection quantity map for calculating a target common rail pressure, total amount of injections, the number of multistage injection, the respective injection quantity and the respective injection quantity timing, the diesel engine 10 comprises a total injection quantity increasing means for increasing the total amount of injections in the injection quantity control arithmetic means and an injection number reduction avoidance means for avoiding that the number of multistage injections are changed by the total injection quantity increasing means when the engine is transferred to a cold state to a warming state.

17 Claims, 6 Drawing Sheets

U.S. PATENT DOCUMENTS 7,278,397 B2 * 10/2007 Kobayashi .................. 123/431

FOREIGN PATENT DOCUMENTS

| JP | 11-173200 | 6/1999 |
| --- | --- | --- |
| JP | 2000-205021 | 7/2000 |
| JP | 2001-193463 | 7/2001 |
| JP | 2001-336440 | 12/2001 |
| JP | 2005-299470 | 10/2005 |
| JP | 2006-336509 | 12/2006 |
| JP | 2007-040310 | 2/2007 |

* cited by examiner

DIESEL ENGINE

BACKGROUND OF THE INVENTION

1. Field of the Invention

The present invention relates to controlling a fuel injection of a diesel engine equipped with a fuel injection device performing a multistage injection.

2. Related Art

As a fuel injection system of a diesel engine, there is well-known a common-rail (electronically-controlled accumulator) system.

Because the common-rail can store a high-pressure fuel into a vessel called a rail, it has a feature capable of adjusting an injection pressure of the fuel so as to inject it, regardless of an engine rotation speed or a load. The common-rail can also inject an optimal amount of fuel at an optimal timing using an electronic control. Therefore, the diesel engine can freely inject the fuel using the electronic control and the common-rail system. Thus, the performance of the diesel engine, such as an output, a fuel consumption and an exhaust gas, has been remarkably improved, due to the common-rail system.

When the common-rail injects the fuel by compressing an intake air, it can inject the fuel by multistage injections (a multistage injection control). In general, each of the injections is referred to as a pilot injection, a pre-injection, a main injection, an after injection, a post injection or the like, in order of earlier injection timing. For example, the pilot injection injects the fuel prior to the main injection so as to mix the air and the fuel before igniting, thereby reducing a combustion sound peculiar to the diesel engine.

In the multistage injection control of the common-rail, for example, there are well-known some improvements in the pilot injection. JP 1998-122022 discloses a fuel injection device that stops the pilot injection while a surging is generating. JP 2000-205021 discloses a fuel injection device that stops the pilot injection when a main injection quantity is larger than a pilot injection quantity.

Patent Literature 1: the Japanese Patent Laid Open Gazette 1998-122022

Patent Literature 2: the Japanese Patent Laid Open Gazette 2000-205021

In recent years, a problem of smoke discharged from the exhaust gas of automobiles has become an environmental nightmare. Smoke generally include white smoke, blue smoke and black smoke. Herein, white smoke is defined as white smoke discharged at an engine starting or soon after starting. A sprayed fuel collides with a combustion chamber wall surface at low temperature so as to attach to it, and the attached fuel is combusted and discharged without enough evaporation, whereby white smoke is generated. Therefore, the generation of white smoke is improved by reducing the amount of fuel attached to the combustion chamber wall surface.

Using the common-rail electronic control injection device, required fuel can be divided and injected into a cylinder by multistage injections. Consequently, since injection quantity and injection time per injection are reduced, a penetrating power of fuel injection is weakened, and at the same time, the amount of fuel attached to the wall surface is decreased. Therefore, as the number of injections is increased, the discharging efficiency of white smoke is improved.

DISCLOSURE OF INVENTION

Problems to be Solved by the Invention

However, as the engine is transferred from a cold state to a warming state, engine temperature such as engine coolant water temperature or lubricant oil temperature is increased. As a result, mechanical loss is reduced, and total amount of fuel injection quantity is decreased. In this case, when each of the injection quantities in the multistage fuel injection control is injectable injection quantity set up at an injector or less, pre-injection having lower priority is stopped. In a transitional period when the number of injections in the multistage fuel injection control is decreased, the fuel is not fully evaporated at the main injection, thereby increasing the discharge amount of the white smoke.

Therefore, the problem to be solved is to decrease the amount of white smoke while the engine is transferred from the cold state to the warming state, in the diesel engine performing the multistage injection.

SUMMARY OF THE INVENTION

Means for Solving the Problem

The problem so as to be solved by the present invention is as mentioned above. Next, the means of solving the problem will be described.

In the first aspect of the present invention, in a diesel engine equipped with a fuel injection device having a fuel supply pump for pressingly sending a fuel, a common rail for accumulating the fuel pressingly sent from the fuel supply pump, injectors for injecting the fuel into cylinder by an electronic control, an engine operating condition detection means for detecting an engine operating condition and an injection quantity control arithmetic means for calculating a target common rail pressure, a total amount of injection, the number of multistage injection, the respective injection quantity and the respective injection timing based on an output of the engine operating condition detection means, the diesel engine comprises a total injection quantity increasing means for increasing the total amount of injections in the injection quantity control arithmetic means, and an injection number reduction avoidance means for avoiding that the number of multistage injections are changed by the total injection quantity increasing means when the engine is transferred to a cold state to a warming state.

In the second aspect of the present invention, in the diesel engine of the first aspect, the number of multistage injections in the injection number reduction avoidance selecting means is at least twice or more.

In the third aspect of the present invention, in the diesel engine of the first aspect, the injection number reduction avoidance selecting means is canceled when at least one of an engine coolant water temperature, a lubricant oil temperature or an acceleration opening degree by the engine operating condition detection means is a predetermined value or higher.

In the fourth aspect of the present invention, in the diesel engine of the first aspect, the selection or cancel of the injection number reduction avoidance selecting means can be arbitrarily selected.

In the fifth aspect of the present invention, in the diesel engine of the third or fourth aspect, the diesel engine comprises an exhaust sound change avoidance means for controlling the respective injection timings and the respective injection quantities of the injection quantity control arithmetic means so that the exhaust sound is not changed when the injection number reduction avoidance selecting means is canceled.

In the sixth aspect of the present invention, in the diesel engine of the first aspect, the diesel engine comprises a pressure regulating valve for adjusting a common rail pressure in the common rail, as well as the total injection quantity increasing means leaks the fuel by the pressure regulating valve and increases the amount of the fuel pressingly sent in the fuel supply pump so that the rail pressure becomes the target common rail pressure calculated by the injection quantity control arithmetic means.

In the seventh aspect of the present invention, in the diesel engine of the first aspect, the diesel engine comprises a load device and the total injection quantity increasing means is connected to the load device.

In the eighth aspect of the present invention, in the diesel engine of the first aspect, the diesel engine comprises a cylinder cut-off means and the total injection quantity increasing means per one cylinder performs the cylinder cut-off by the cylinder cut-off means.

In the ninth aspect of the present invention, in the diesel engine of the first aspect, the diesel engine comprises a generator driven by the diesel engine, and the total injection quantity increasing means increases an electric-generating capacity of the generator.

In the tenth aspect of the present invention, in the diesel engine of the first aspect, the diesel engine comprises an engine coolant water temperature increasing means, and the increased electricity-generating capacity is used for the engine coolant water temperature increasing means.

In the eleventh aspect of the present invention, in the diesel engine of the first aspect, the diesel engine comprises an intake air temperature or a cylinder temperature increasing means, and the increased electricity-generating capacity is used for the intake air temperature or the cylinder temperature increasing means.

In the twelfth aspect of the present invention, in the diesel engine of the first aspect, the diesel engine comprises an electric supercharger means, and the increased electric-generating capacity is used for driving the electric supercharger means.

In the thirteenth aspect of the present invention, in the diesel engine of the first aspect, the diesel engine comprises an intake throttle, and the total injection quantity increasing means narrows down an opening degree of the intake throttle.

In the fourteenth aspect of the present invention, in the diesel engine of the first aspect, the diesel engine comprises an exhaust throttle, and the total injection quantity increasing means narrows down an opening degree of the exhaust throttle.

In the fifteenth aspect of the present invention, in the diesel engine of the first aspect, the diesel engine comprises a variable valve timing means, and the total injection quantity increasing means shortened the time of opening both of an intake valve and an exhaust valve by the variable valve timing means.

In the sixteenth aspect of the present invention, in the diesel engine of the first aspect, the diesel engine comprises a supercharger having a variable wing means, and the total injection quantity increasing means decreases an opening degree of a variable wing in the variable wing means.

Effect of the Invention

Due to the present invention, the following effects can be achieved.

According to the first aspect of the present invention, as the number of multistage injections are not decreased while the engine is transferred to the cold state to the warming state, the discharging efficiency of white smoke can be improved.

According to the second aspect of the present invention, in addition to the effect of the first aspect, as the number of multistage injections is constantly two times or more, while the engine is transferred from the cold state to the warming state, the combustion efficiency can be advanced so as to improve the discharging efficiency of the white smoke.

According to the third aspect of the present invention, in addition to the effect of the first aspect, when the engine is fully transferred to a steady state (the warming state), the injection number reduction avoidance means having a larger fuel injection quantity can be canceled. In other words, the deterioration of the fuel consumption in the engine can be prevented.

According to the fourth aspect of the present invention, in addition to the effect of the first aspect, since the cancel or the selection of the injection number reduction avoidance means can be arbitrarily performed, the injection number reduction avoidance means can be used depending on the situation. In other words, the usability of the injection number reduction avoidance means can be improved.

According to the fifth aspect of the present invention, in addition to the effect of the third or fourth aspect, the deterioration of the combustion noise performance can be restrained when the injection number reduction avoidance means is canceled.

According to the sixth aspect of the present invention, in addition to the effect of the first aspect, excess fuel is pressingly sent from a fuel supply pump, thereby increasing the mechanical losses. Accordingly, the total amount of injection is increased so as to maintain the number of fuel injections. Briefly, the discharging efficiency of white smoke can be improved.

According to the seventh aspect of the present invention, in addition to the effect of the first aspect, the diesel engine is connected to the load device, thereby increasing mechanical losses. Accordingly, the total amount of injection is increased so as to maintain the number of fuel injections. Briefly, the discharging efficiency of white smoke can be improved.

According to the eighth aspect of the present invention, in addition to the effect of the first aspect, total amount of injections per a cylinder driven by the cylinder cut-off are doubled, thereby maintaining the number of fuel injections. Briefly, the discharging efficiency of white smoke can be improved.

According to the ninth aspect of the present invention, in addition to the effect of the first aspect, required driving torque of the generator is increased, thereby increasing mechanical losses. Accordingly, total amount of injection is increased so as to maintain the number of fuel injections. Briefly, the discharging efficiency of white smoke can be improved.

According to the tenth aspect of the present invention, in addition to the effect of the ninth aspect, the warming time of the diesel engine can be shortened using the surplus electricity.

According to the eleventh aspect of the present invention, in addition to the effect of the ninth aspect, the compression end temperature in the cylinders can be increased using the surplus electricity. Accordingly, the discharging efficiency of white smoke can be further improved due to the evaporation of fuel injection and the improved combustion.

According to the twelfth aspect of the present invention, in addition to the effect of the ninth aspect, intake air volume into the cylinders can be increased using the surplus electricity so as to raise the compression end pressure in the cylinders. Accordingly, the discharging efficiency of the white smoke can be further improved due to the evaporation of fuel injection and the improved combustion.

According to the thirteenth aspect of the present invention, in addition to the effect of the first aspect, an inhaling resistance is increased, by narrowing down the opening degree of the intake throttle, thereby increasing an inhalation resistance. Briefly, a pumping loss (the mechanical loss associated with gas exchange of the engine) is increased. Accordingly, total amount of injection is increased so as to maintain the number of fuel injections. Consequently, the discharging efficiency of white smoke can be improved.

According to the fourteenth aspect of the present invention, in addition to the effect of the first aspect, an emitting resistance is increased, by lowering the opening degree of the exhaust throttle, so that an exhaust resistance can be increased. Briefly, a pumping loss is increased. Accordingly, total amount of injection is increased so as to maintain the number of fuel injections. Consequently, the discharging efficiency of white smoke can be improved.

According to the fifteenth aspect of the present invention, in addition to the effect of the first aspect, the overlap period in the intake and exhaust is shortened using the variable valve timing means, so that the amount of the residual gas in the cylinders is increased, so as to recompress the residual gas. Briefly, the pumping loss and compression work are increased. Accordingly, total amount of injection is increased so as to maintain the number of fuel injections. Consequently, the discharging efficiency of white smoke can be improved.

According to the sixteenth aspect of the present invention, in addition to the effect of the first aspect, the emission resistance is increased, by reducing the opening degree of the variable wing in the supercharger having the variable wing means, so that the exhaust resistance can be increased. Briefly, a pumping loss is increased. Accordingly, total amount of injection is increased so as to maintain the number of fuel injections. Consequently, the discharging efficiency of white smoke can be improved.

DETAILED DESCRIPTION OF THE INVENTION

Next, embodiments of the present invention will be described.

Figure 1:
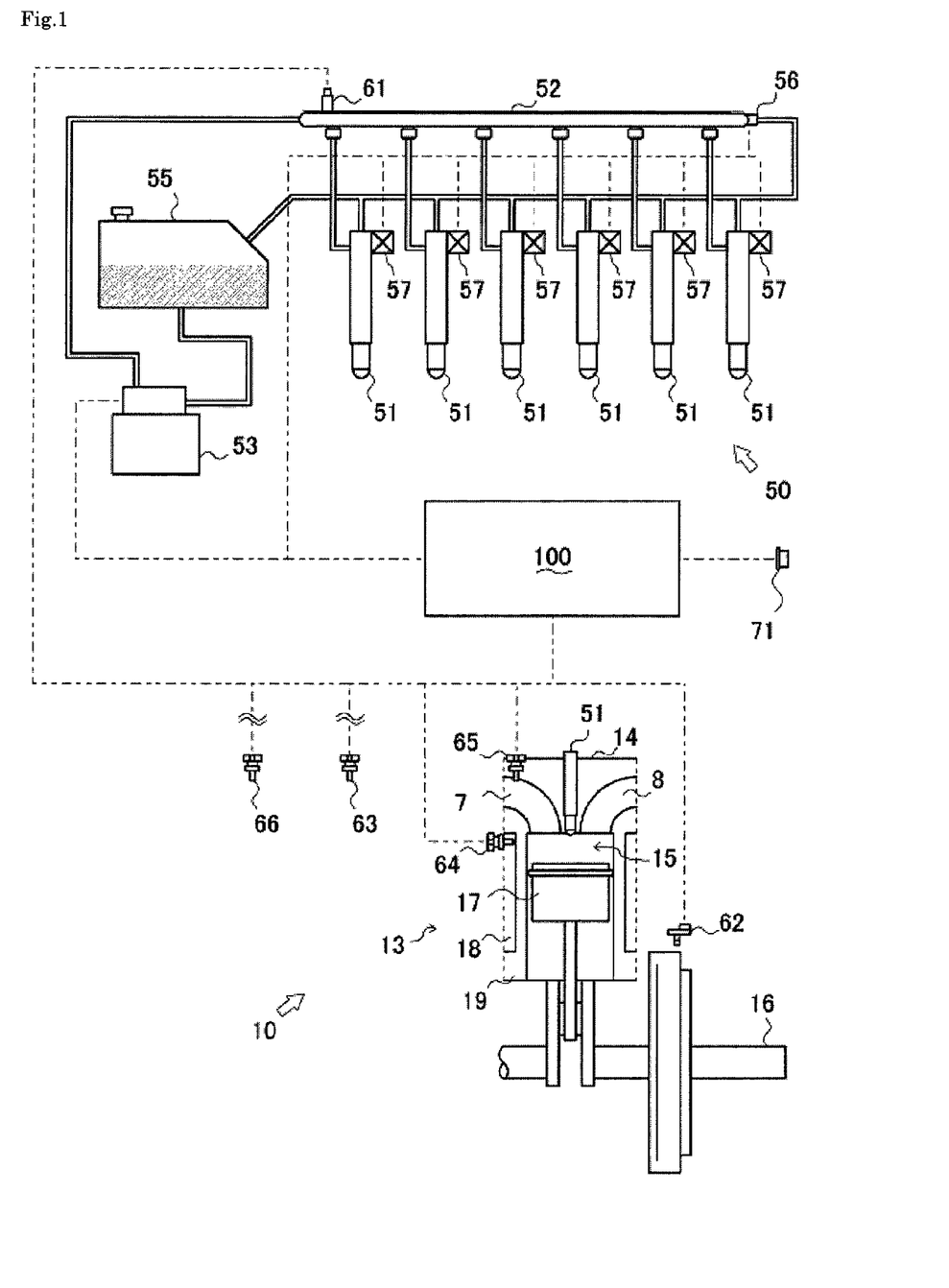
FIG. 1 is a configuration diagram of a construction of a fuel injection device according to an embodiment of the present invention.
Figure 2:
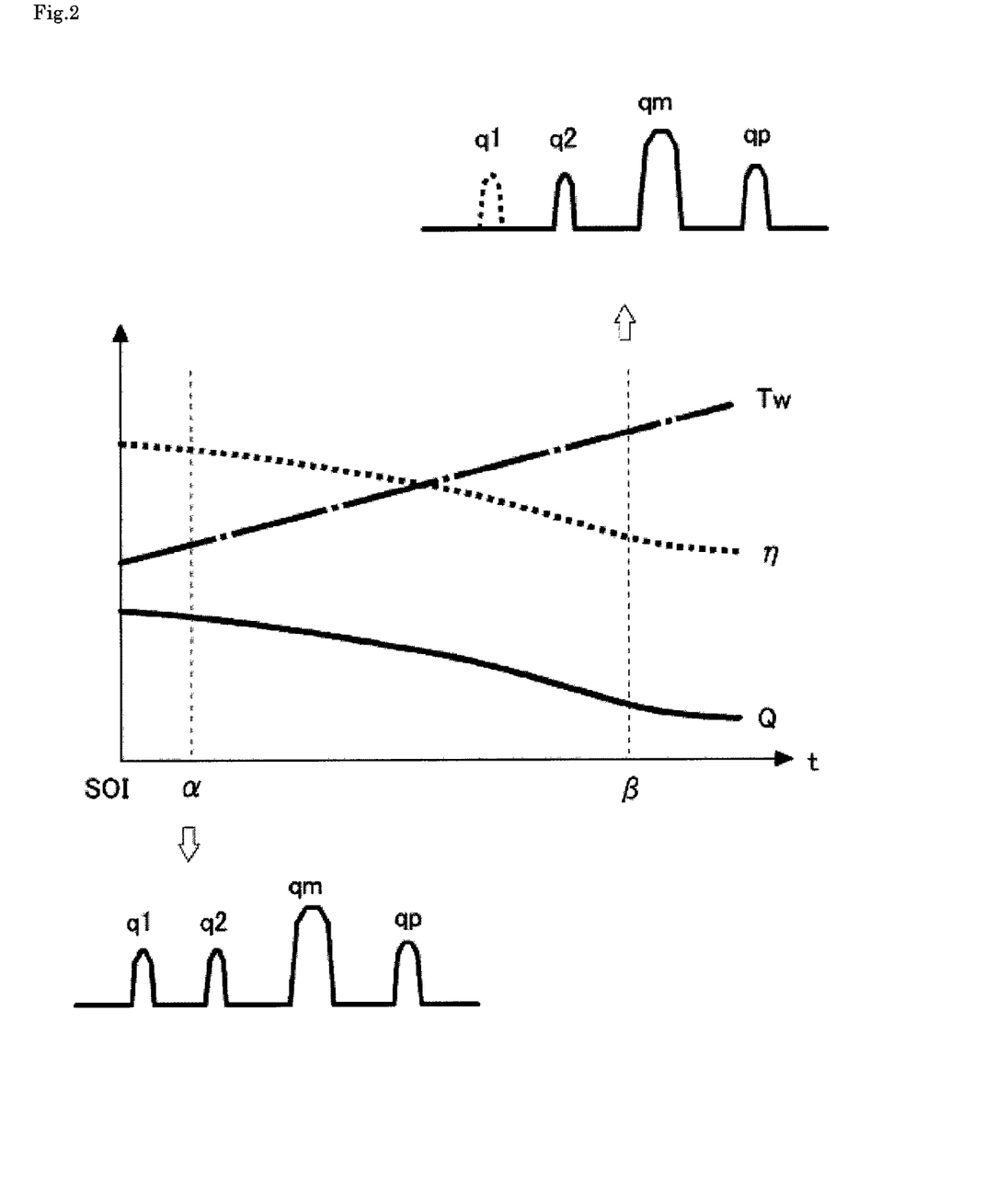
FIG. 2 is a graph chart illustrating a reduction of total amount of injection after starting an engine.
Figure 3:
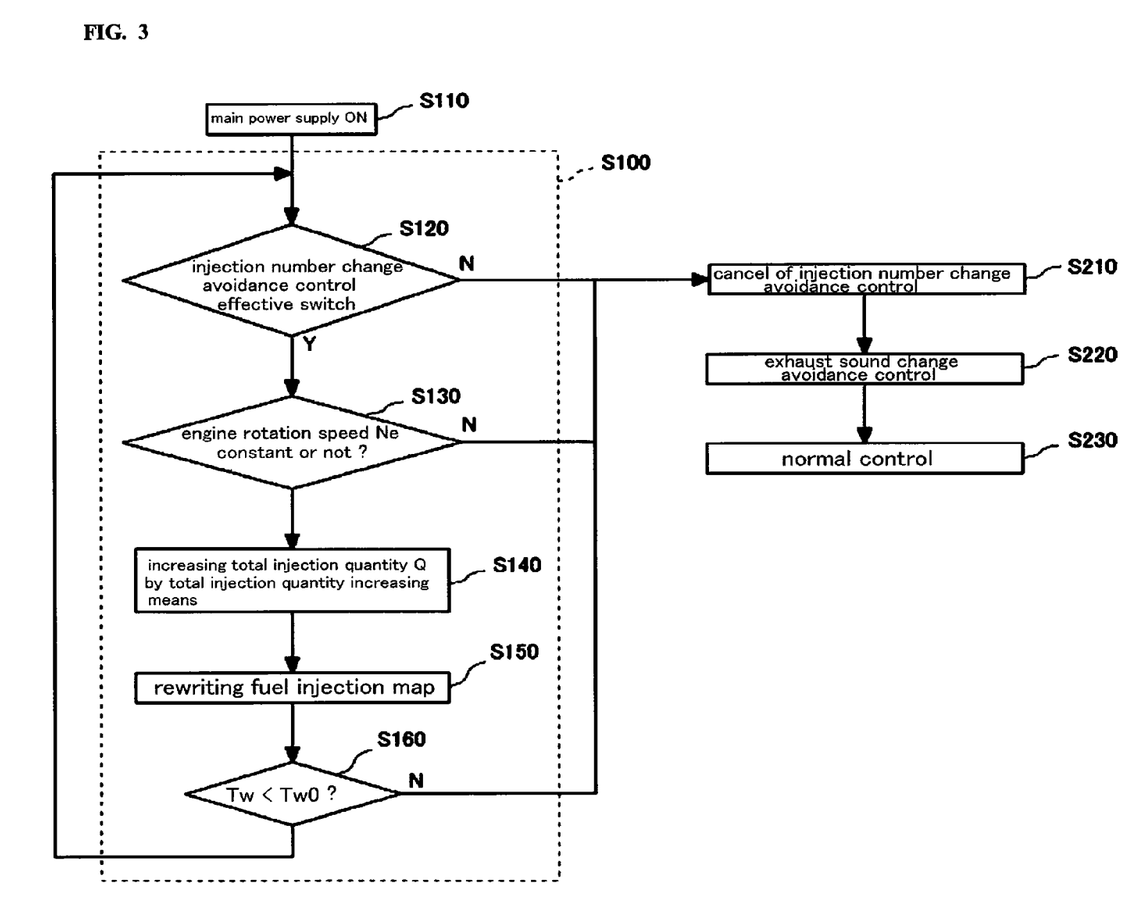
FIG. 3 is a flow diagram illustrating an injection number avoidance control as an embodiment of the present invention.

FIG. 1 is a configuration diagram of a construction of a fuel injection device according to an embodiment of the present invention. FIG. 2 is a graph chart illustrating a reduction of total amount of injection after starting an engine. FIG. 3 is a flow diagram illustrating an injection number avoidance control as an embodiment of the present invention.

Figure 4:
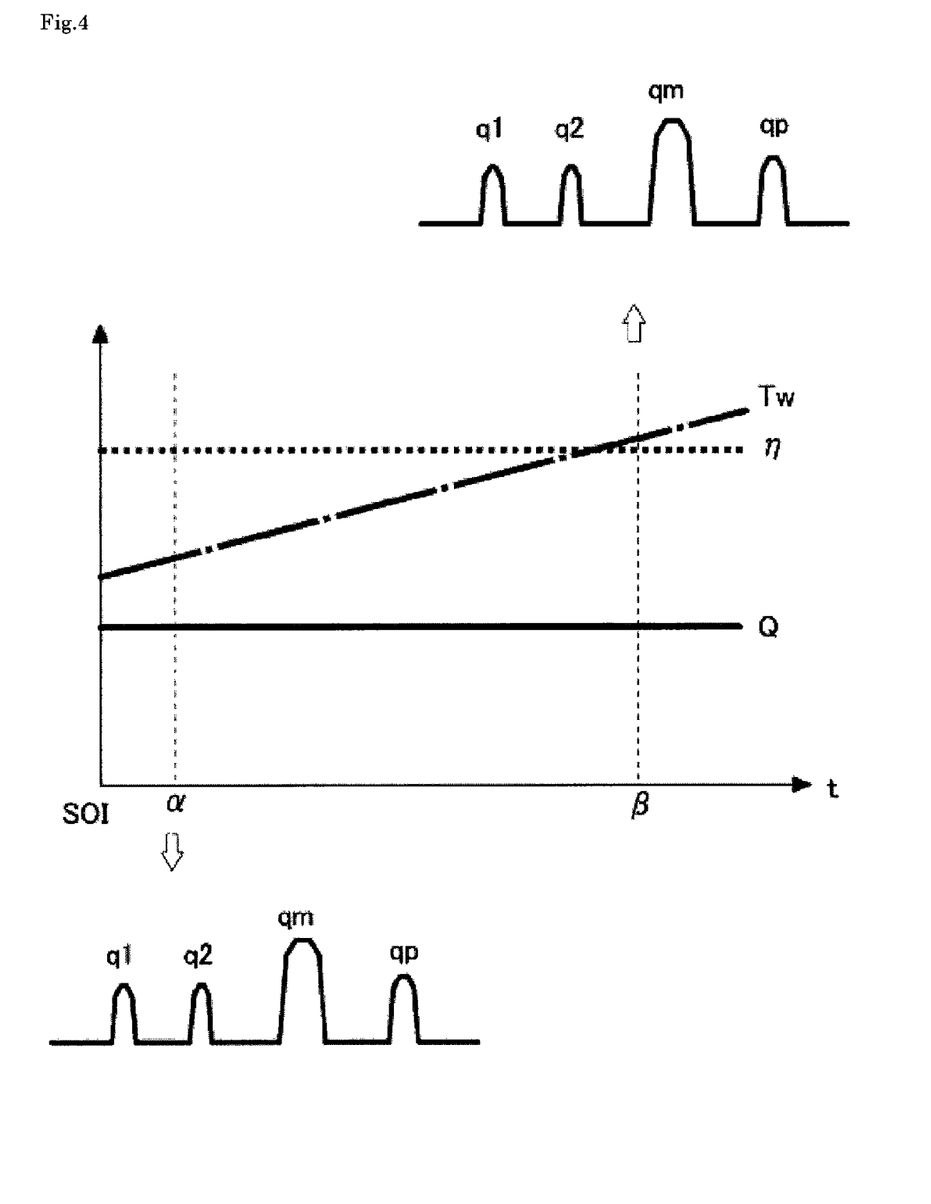
FIG. 4 is a graph chart illustrating an effect of the injection number avoidance control as the embodiment of the present invention.
Figure 5:
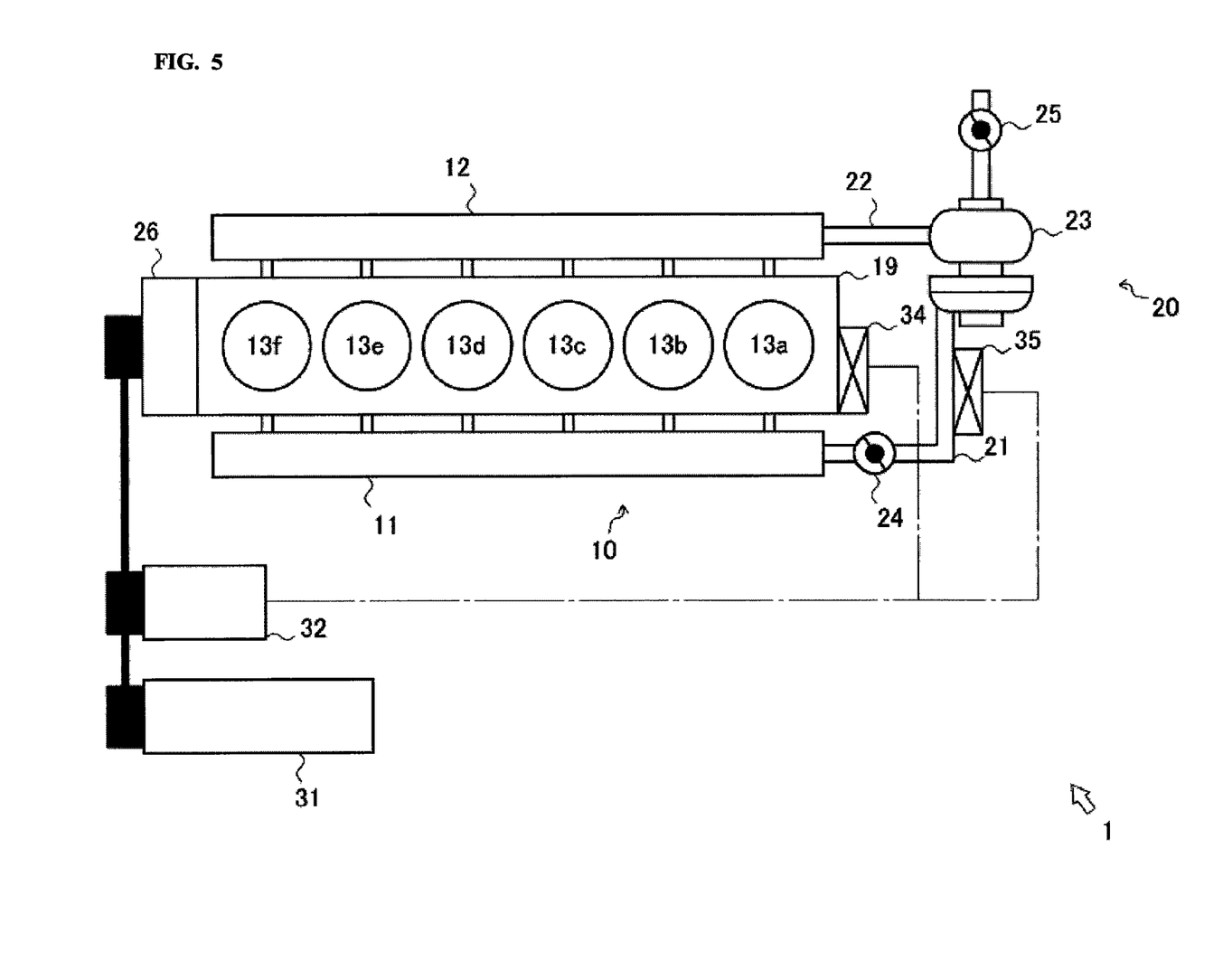
FIG. 5 is a configuration diagram of en entire construction of a diesel engine system according to an embodiment of the present invention.
Figure 6:
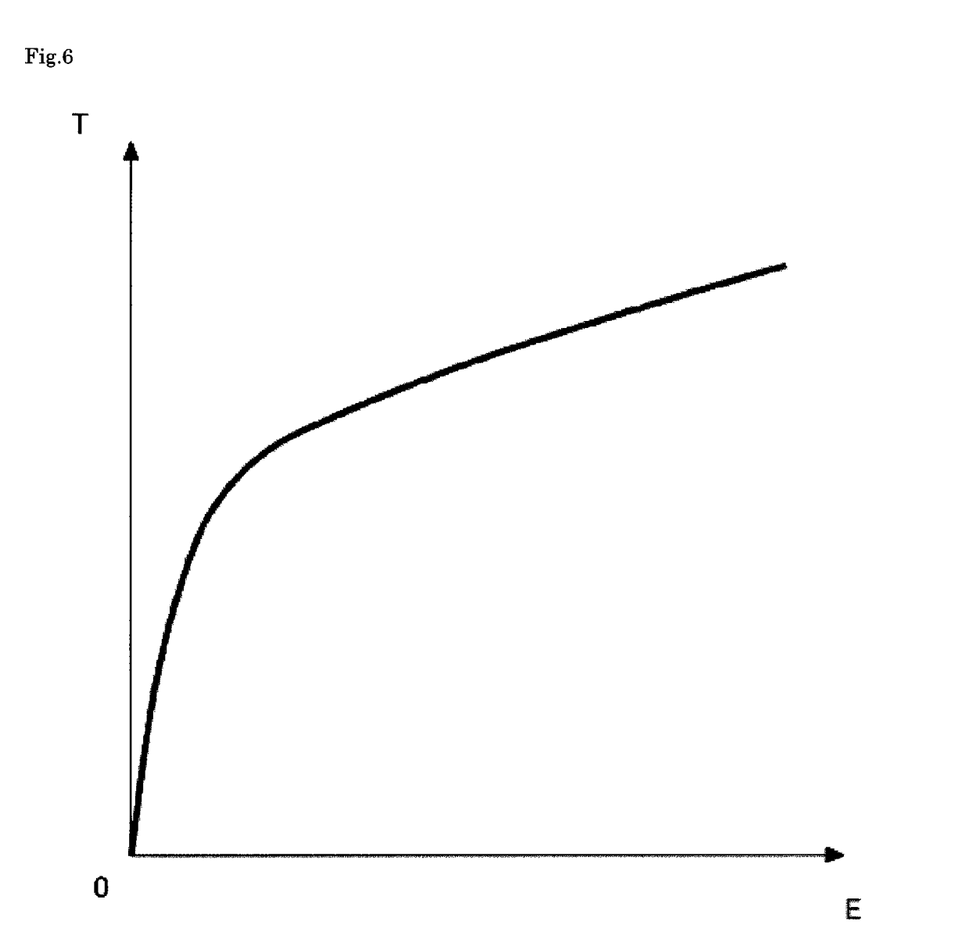
FIG. 6 is a graph chart illustrating a relationship between an electric-generating capacity of a generator and a driving torque.

FIG. 4 is a graph chart illustrating an effect of the injection number avoidance control as the embodiment of the present invention. FIG. 5 is a configuration diagram of en entire construction of a diesel engine system according to an embodiment of the present invention. FIG. 6 is a graph chart illustrating a relationship between an electric-generating capacity of a generator and a driving torque.

Firstly, a fuel injection device 50 to which applies the present invention will be briefly described with reference to FIG. 1. The fuel injection device 50 of the present embodiment is one device comprising a diesel engine system 1. The diesel engine system 1 will be described in detail below.

As shown in FIG. 1, the fuel injection device 50 comprises a plurality of injectors 51, which are electronically-control fuel injection devices injecting fuel to the respective cylinder by an opening and closing operations of solenoid valves 57, a common rail 52, which accumulates high pressure fuel so as to distribute the respective injectors 51 and a fuel supply pump (High Pressure Pump, hereinafter, referred to as HPP) 53, which pressingly sends fuel in a fuel tank 55. The pressure in the common rail 52 is adjusted to a target rail pressure using pressure control valve (hereinafter, referred to as PCV) 56.

An arithmetic control means (Engine Control Unit, hereinafter, referred to as ECU) 100 drives the HPP 53 so as to pressingly send the fuel to the common rail 52 and accumulates the fuel adjusted to the given pressure using the PCV 56 into the common rail 52. The ECU 100 injects the high pressure fuel to the respective cylinder by opening and closing the solenoid valves 57 of the respective injectors 51.

Next, respective sensors as engine operating condition detection means for detecting the operating condition of an engine 10, so as to control the aforementioned fuel injection device 50, will be briefly described with reference to FIG. 1. Respective cylinder 13 of the engine 10 for installing the respective sensors will be briefly described. In this regard, FIG. 1 schematically shows only one cylinder 13.

As shown in FIG. 1, the cylinder 13 of the engine 10 comprises a cylinder head 14 including an intake port 7 and an exhaust port 8, a cylinder block 19 that fixes the cylinder head 14 thereon and that a combustion chamber 15 is formed therein, a piston 17 that slidably reciprocates in the combustion chamber 15 so as to rotate a crankshaft 16 via a con rod, or the like. A coolant water passage (water jacket) 18 is provided on the periphery of the combustion chamber 15 of the cylinder block 19. In this respect, descriptions on the respective behaviors of the aforementioned members will be omitted.

The ECU 100 is connected to a pressure sensor 61, a rotation speed sensor 62, a load sensor 63, a coolant water temperature sensor 64, an intake air temperature sensor 65 and a lubricant oil temperature sensor 66, so as to detect the operation condition of the engine 10. The pressure sensor 61 detects a pressure in the common rail 52. The rotation speed sensor 62 detects a rotation speed of the crankshaft (or a flywheel) 16. The load sensor 63 detects a load of the engine 10. The coolant water temperature sensor 64 detects a coolant water temperature of engine coolant water. The intake air temperature sensor 65 detects an intake air temperature of the engine 10. The lubricant oil temperature sensor 66 detects a lubricant oil temperature.

The ECU 100 is connected to an injection number reduction avoidance switch 71 that can select an injection number reduction avoidance as described in detail below.

The ECU 100 includes a fuel injection map (not shown), which memorizes the injection number, the injection quantity and the injection timing depending on the operating condition of the engine 10 and that can rewrite them, as an injection quantity control arithmetic means.

Harmful effects due to the reduction of the total injection quantity after starting the engine will be described with reference to FIG. 2. FIG. 2 shows the state of the respective cylinder 13 after starting the engine 10, which shows the time series variations of the total injection quantity Q of the injectors 51, the mechanical loss η of the engine 10 and the engine coolant water temperature Tw after SOI (Start Of Ignition). In FIG. 2, multistage injection behaviors in each of the cold state α and the warming state β of the engine 10 are shown as relationship diagrams, which shows the respective injection timings and injection quantities in a pilot 1 (q1), a pilot 2 (q2) a main (qm) and a post (qp) injections.

As shown in FIG. 2, as the engine 10 is transferred to the cold state α to the warming state β, harmful effects are caused when the injection number of the multistage injection control is reduced.

More specifically, as the engine 10 is transferred to the cold state α to the warming state β, the engine coolant water temperature Tw is increased. Then, the mechanical loss η is reduced and the total injection quantities Q of the fuel is decreased.

At this time, while the operating condition of the engine 10 becomes better, the injection having a lower priority (for example, the pilot 1 (q1)) is stopped, in the transitional period when the respective injection quantities in the multistage injection are the injectable injection ones set up in the respective injectors 51 or less, whereby the main injection has a few more injection quantity. Consequently, the injection number in the multistage injection control is decreased, and the fuel can be not fully evaporated at the time of main injection so as to be discharged, so that the white smoke is generated.

In order to solve the aforementioned harmful effects, an injection number reduction avoidance control (S100) due to an injection number reduction avoidance selecting means will be described in detail with reference to FIG. 3.

As shown in FIG. 3, the ECU 100 confirms whether the injection number reduction avoidance switch 71 is turned on or not, after the main power supply has been turned on (S110) (S120). The ECU 100 confirms whether the engine rotation speed Ne detected by the engine rotation speed sensor 62 is constant (within a predetermined range at a predefined time) or not, when the avoidance switch 71 is turned on (S130). In this regard, the ECU 100 increases the total injection quantities of the injectors 51 using an injection quantity increasing means when the engine rotation speed Ne is constant (S140) and rewrites the fuel injection quantity map (S150). Next, the ECU 100 confirms whether the engine coolant water temperature Tw detected by the coolant water temperature sensor 64 is a prescribed temperature Tw0 or lower (S160). The ECU 100 repeats the steps S120 to S140 when the engine coolant water temperature Tw is the prescribed temperature Tw0 or lower.

Meanwhile, when the injection number reduction avoidance means is turned off or considered to be turned off (S120), when the engine rotation speed Ne is not constant (S130), and when the engine coolant water temperature is higher than the prescribed temperature Tw0 (S160), the ECU 100 cancels the present control (S210). The ECU 100 performs an exhaust sound change avoidance control (S220), so as to return to a normal engine control (S230).

The above-mentioned injection number reduction avoidance control (S100) is constructed so that it can be selected or canceled by the injection number reduction avoidance switch 71. The injection number reduction avoidance control (S100) can improve the discharging performance of the white smoke, while it has an aspect of deteriorating the fuel injection quantity. Therefore, an operator can arbitrarily select the injection number reduction avoidance control (S100) depending on the situation. Accordingly, the usability of the injection number reduction avoidance control (S100) can be advanced.

In the Step S160, when the engine temperature (the engine coolant water temperature Tw) is sufficiently high, the injection number reduction avoidance control (S100) is canceled. The injection number reduction avoidance control (S100) controls so that the total injection quantity Q purposely increases, thereby increasing the fuel consumption.

Therefore, when the engine 10 is fully transferred to the warming state, the injection number reduction avoidance control (S100) is canceled, thereby preventing the deterioration in the fuel consumption of the engine.

In the aforementioned injection number reduction avoidance control (S 160), the transfer of the engine to the steady state (the warming state) is confirmed by detecting the engine coolant water temperature Tw. However, in the present embodiment, with regard to the transfer of the engine to the steady state (the warming state), the transfer of the engine to the warming state can be confirmed as is the case with the engine coolant water temperature Tw, when the lubricant oil temperature detected by the lubricant oil temperature sensor 66 and the intake air temperature of the engine 10 detected by the intake air temperature sensor 65 are the predetermined values or higher. It can be confirmed that the engine 10 is transferred to the steady state (the warming state), when the load of the engine 10 detected by the load sensor 63 is constant.

Briefly, in the Step S160, it may be also detected whether the engine 10 is warmed up to the predefined temperature, using the lubricant oil temperature sensor 66, the intake air temperature sensor 65 or the load sensor 63, instead of detecting the engine coolant water temperature Tw.

In addition, the aforementioned exhaust sound change avoidance control (S220) will be described in detail, as the exhaust sound change avoidance means.

The injection number in the multistage injection control may be reduced, after the injection number reduction avoidance control (S100) has been canceled. In this case, the combustion sound in the engine 10 is varied, thereby causing the dissonance.

In this regard, the exhaust sound change avoidance control (S220) rewrites the fuel injection quantity map so as to change the injection timings of the multistage injection with the injection number reduced. For example, when the pilot 1 (q1) is canceled, the injection timing of the pilot 2 (q2) is advanced, those of the main (qm) and the post (qp) are retarded. Incidentally, in the present embodiment, the changing pattern of the fuel injection is not especially limited, if it is a pattern that can reduce the combustion sound.

Also, in the aforementioned injection number reduction avoidance control (S100), the minimum injection numbers are defined as twice, when it rewrites the fuel injection quantity map (S150).

Accordingly, in the multistage injection, the injection numbers of the engine 10 are defined as twice or more, so that the combustion efficiency is enhanced and the discharging performance of the white smoke is improved.

The effects of the above-described injection number reduction avoidance control (S100) will be described with reference to FIG. 4. FIG. 4 shows the state after starting the engine 10 as is the case with FIG. 2, and the detailed description thereof will be omitted.

As shown in FIG. 4, when the engine 10 is transferred to the cold state α to the warming state β, the injection numbers in the multistage injection control are controlled so as not to be changed.

Specifically, as the engine 10 is transferred to the cold state α to the warming state β, even when the coolant water temperature Tw is increased, and when the mechanical loss η is constant, the total injection quantity Q of the fuel is also constant without being reduced.

Accordingly, since the injection numbers in the multistage injection control are not decreased, the discharge of the white smoke remains reduced.

Next, the injection quantity increasing means will be described with examples as embodiments 1 to 5. The injection quantity increasing means as described below increases the injection quantities of the injectors 51 by increasing the mechanical loss η. Hereinafter, the mechanical loss η is increased and the fuel injection quantity is increased, by controlling the fuel injection device 50 in the embodiments 1 and 2, by connecting the means to a load system 30 in the embodiment 3, by increasing the electricity-generating capacity E of the generator 32 in the embodiment 4 and by the intake and exhaust system 20 in the embodiment 5, respectively.

The diesel engine system 1 as an embodiment of the present invention will be briefly described with reference to FIG. 5.

As shown in FIG. 5, the diesel engine system 1 comprises the engine 10, the intake and exhaust system 20 and the load system 30.

The engine 10 is, for example, direct injection six-cylinder diesel engine (hereinafter, referred to as the engine) 10, which is an internal combustion engine that compresses only air and directly injects the light oil thereto so as to performing a self ignition. The engine 10 includes six cylinders 13a to 13f in the cylinder block 19. The intake manifold 11 is a manifold that connects the cylinder heads of the respective branched cylinders 13a to 13f (the first to sixth cylinders) and one intake pipe 21. On the other hand, the exhaust manifold 12 is a manifold that connects the cylinder heads of the respective branched cylinders 13a to 13f and one exhaust pipe 22.

The intake and exhaust system 20 includes the intake pipe 21 having an intake throttle 24, the exhaust pipe 22 having an exhaust throttle 25 and a variable nozzle turbine (hereinafter, referred to as VNT) 23 as a variable wing means.

The intake throttle 24 and the exhaust throttle 25 are valves that regulate the amount of the airs sent to the engine 10 or discharged from the engine 10. The intake throttle 24 and the exhaust throttle 25 are essentially used for increasing the amount of the exhaust gases returned from the exhaust side to the intake side of the engine 10 by the exhaust gas recirculation system (Exhaust Gas Recirculation).

The VNT 23 is a turbocharger that can change the speed of the exhaust gas flowing to the turbine (not shown). Specifically, the VNT 23 can control the speed of the exhaust gas by opening and closing a valve called a nozzle vane upstream of the turbine.

As the variable valve timing means, a variable valve timing device 26 is a device for switching the opening and closing timings of the intake valve (not shown) and the exhaust valve (not shown). The intake and exhaust valve is usually vertically driven using the cam. The variable valve timing device 26 includes both a cam for low rotation and a cam for high rotation and can hydraulically change over the cam used depending on the engine rotation.

The load system 30 includes a viscous coupling 31 and a generator 32, as load devices. The viscous coupling 31 is constructed so that it can arbitrarily engage or disengage to the engine 10. The viscous coupling 31 is kind of a fluid clutch, which generates heat using the shear resistance of sealed silicone oil having a high viscosity.

Meanwhile, the generator 32 accumulates the generating electricity generated by driving the engine 10 into a battery (not shown), as an electric power for driving a starter (not shown) or the like. The generator 32 is connected to an electric fire 34 for heating the engine coolant water, an air heater 35 for heating the intake air and a glow plug (not shown) provided with the respective cylinder 13 as a preheating device.

The injection quantity increasing means of the embodiment 1 will be described with reference to FIG. 5.

As shown in FIG. 5, the pressure in the common rail 52 is adjusted using the HPP53 and the PCV 56. In general, the ECU 100 makes the HPP53 send only the fuel required for maintaining the target rail pressure calculated by the fuel injection map, as an intake amount adjusting method. At this time, when the engine rotation speed Ne is decreased, the ECU 100 makes the PCV 56 reduce the rail pressure to follow the target rail pressure.

In the embodiment 1, the ECU 100 pressingly sends the fuel from the HPP 53 to the common rail 52 so that the rail pressure is higher than the target rail pressure calculated using the fuel injection map. In this case, an excess supply fuel is leaked from the PCV 56.

Consequently, the drive torque of the HPP 53 is increased, and the mechanical loss η is increased, compared with the intake amount adjusting method.

Accordingly, the drive torque of the HPP 53 is increased, i.e., the mechanical loss η is increased, whereby the total injection quantity Q is increased so as to maintain the number of fuel injections. Briefly, the discharging performance of white smoke can be improved.

The injection quantity increasing means of the embodiment 2 will be described with reference to FIG. 1. As shown in FIG. 1, the ECU 100 independently controls the respective injectors 51 so as to control the opening and closing of the injectors 51. In other words, the ECU 100 can include the cylinder cut-off means so as to perform the cylinder cut-off that disables a part of the cylinder to operate. When the cylinder cut-off is performed, for example, when the operations of the first, second and third cylinders are stopped, the cylinder cut-off means does not injects the fuel to the first, second and third cylinders, but approximately doubly increases the injection quantities of the fourth, fifth and sixth cylinders, as well as increases the required torques per the fourth, fifth and sixth cylinders, so as to obtain substantially the same torques as in the case when all cylinders are driven.

Thus, in the embodiment 2, the cylinder cut-off is performed as the injection quantity increasing means, thereby increasing the injection quantity per each of the driven cylinders.

Accordingly, the drive torque of the HPP 53 is increased, i.e., the mechanical loss η is increased, whereby the total injection quantity Q is increased so as to maintain the number of fuel injections. Briefly, the discharging performance of the white smoke can be improved.

The injection quantity increasing means of the embodiment 3 will be described with reference to FIG. 5. As shown in FIG. 5, the viscous coupling 31 is constructed so that it can engage and disengage with the crankshaft 16. In the embodiment 3, the viscous coupling 31 is connected to the crankshaft 16, as the injection quantity increasing means.

As described above, the viscous coupling 31 is connected to the crankshaft 16, as the load device, i.e., the mechanical loss η is increased, so that the total injection quantity Q is increased so as to maintain the number of the fuel injections. Briefly, the discharging performance of the white smoke can be advanced.

The injection quantity increasing means of the embodiment 4 will be described with reference to FIGS. 5 and 6. As shown in FIG. 5, generally, in the electronic control diesel engine system 1, the generator 32 is interlocked and connected via a belt or the like to the crankshaft 16. As shown in FIG. 6, as the electricity-generating capacity E of the generator 32 is larger, the larger drive torque T is required.

In the embodiment 4, the electricity-generating capacity E of the generator 32 is increased as the injection quantity increasing means, thereby increasing the drive torque T.

Accordingly, the drive torque T of the generator 32 as the load device is increased, i.e., the mechanical loss η is increased, whereby the total injection quantity Q is increased so as to maintain the number of fuel injections. Briefly, the discharging performance of white smoke can be improved.

In the injection quantity increasing means of the embodiment 4 as mentioned above, surplus electricity by the generator 32 is obtained.

In this regard, the usage of the surplus electricity will be described.

As shown in FIG. 5, the generator 32 is connected to the electric fire 34 as the engine coolant water temperature increasing means. The engine coolant water can be heated using the electric fire 34, due to the surplus electricity by the generator 32. Thus, the warming time for the engine 10 can be shortened.

As shown in FIG. 5, the generator 32 is connected to the air heater 35 and the glow plug as the cylinder temperature increasing means. The inhaled air can be heated using the air heater 35 or the glow plug, due to the surplus electricity by the generator 32. Thus, the compression end temperature in the cylinder 13 can be increased, thereby enhancing the discharging performance of white smoke.

The injection quantity increasing means of the embodiment 5 will be described with reference to FIG. 5.

As the injection quantity increasing means of the embodiment 5, the pumping loss as the mechanical loss η is increased using the intake and exhaust system 20, so as to increase the injection quantities of the injectors 51.

As shown in FIG. 5, the intake pipe 21 and the exhaust pipe 22 are provided therein with the intake throttle 24 and the exhaust throttle 25 respectively. The inhalation resistance or the exhaust resistance is increased, by narrowing down the intake throttle 24 or the exhaust throttle 25, so as to increase the pumping losses.

Accordingly, the mechanical loss η is increased, whereby the total injection quantity Q is increased so as to maintain the number of fuel injections. Briefly, the discharging performance of white smoke can be improved.

As shown in FIG. 5, the engine 10 is provided therein with the variable valve timing device 26. The overlap period is shortened due to the variable valve timing device 26 and the residual gases in the cylinder 13 are increased so as to recompress them, thereby increasing the pumping losses.

Accordingly, the mechanical loss η is increased, whereby the total injection quantity Q is increased so as to maintain the number of fuel injections. Briefly, the discharging performance of white smoke can be improved.

As shown in FIG. 5, the intake and exhaust system 20 is provided therein with the VNT 23. The variable wing of the VNT 23 is narrowed down and the exhaust resistance is increased, so as to increase the pumping loss.

Accordingly, the mechanical loss η is increased, whereby the total injection quantity Q is increased so as to maintain the number of fuel injections. Briefly, the discharging performance of white smoke can be improved.

In this regard, although no drawing is shown, when an electric supercharger is provided with the intake and exhaust system 20, the surplus electricity by the generator 32 can be supplied to the electric supercharger.

Accordingly, the amount of inhaled airs into the cylinder 13 are increased, thereby increasing the compression end temperature in the cylinder 13 and further advancing the discharging performance of white smoke.

INDUSTRIAL APPLICABILITY

The present invention is applicable to the fuel injection control for the diesel engine equipped with the fuel injection device performing the multistage injection.

The invention claimed is:

1. A diesel engine equipped with a fuel injection device having a fuel supply pump for pressingly sending a fuel, a common rail for accumulating the fuel pressingly sent from the fuel supply pump, injectors for injecting the fuel into cylinder engines by an electronic control, an engine operating condition detection means for detecting engine operating condition and an injection quantity control arithmetic means for calculating a target common rail pressure, a total amount of injection, the number of multistage injections, the respective injection quantity and the respective injection timing based on an output of the engine operating condition detection means, the diesel engine comprising:
    a total injection quantity increasing means for increasing the total amount of injections in the injection quantity control arithmetic means, and
    an injection number reduction avoidance means for avoiding that the number of multistage injections is changed by the total injection quantity increasing means when the engine is transferred from a cold state to a warming state.

2. The diesel engine as set forth in claim 1, wherein the number of multistage injections in the injection number reduction avoidance selecting means is at least two.

3. The diesel engine as set forth in claim 1, wherein the injection number reduction avoidance selecting means is canceled when at least one of an engine coolant water temperature, a lubricant oil temperature or an acceleration opening degree by the engine operating condition detection means is a predetermined value or higher.

4. The diesel engine as set forth in claim 1, wherein the selection or deselection of the injection number reduction avoidance selecting means is adapted to be arbitrarily selected.

5. The diesel engine as set forth in claim 3, wherein the diesel engine comprises an exhaust sound change avoidance means for controlling the respective injection timings and the respective injection quantities of the injection quantity control arithmetic means so that the exhaust sound is not changed when the injection number reduction avoidance selecting means is canceled.

6. The diesel engine as set forth in claim 1, wherein the diesel engine comprises a pressure regulating valve for adjusting a common rail pressure in the common rail, and wherein the total injection quantity increasing means leaks the fuel by the pressure regulating valve and increases the amount of the fuel pressingly sent in the fuel supply pump so that the rail pressure becomes the target common rail pressure calculated by the injection quantity control arithmetic means.

7. The diesel engine as set forth in claim 1, wherein the diesel engine comprises a load device and the total injection quantity increasing means is connected to the load device.

8. The diesel engine as set forth in claim 1, wherein the diesel engine comprises a traveling with reduced cylinders means and wherein the total injection quantity increasing means per one cylinder engine performs the traveling with reduced cylinders by the traveling with reduced cylinders means.

9. The diesel engine as set forth in claim 1, wherein the diesel engine comprises a generator driven by the diesel engine, and wherein the total injection quantity increasing means increases an electric-generating capacity of the generator.

10. The diesel engine as set forth in claim 9, wherein the diesel engine comprises an engine coolant water temperature increasing means, and wherein the increased electric-generating capacity is used for the engine coolant water temperature increasing means.

11. The diesel engine as set forth in claim 9, wherein the diesel engine comprises an intake temperature or a cylinder temperature increasing means, and wherein the increased electric-generating capacity is used for the intake temperature or the cylinder temperature increasing means.

12. The diesel engine as set forth in claim 9, wherein the diesel engine comprises an electric supercharger means, and wherein the increased electric-generating capacity is used for driving the electric supercharger means.

13. The diesel engine as set forth in claim 1, wherein the diesel engine comprises an intake throttle, and wherein the total injection quantity increasing means narrows down an opening degree of the intake throttle.

14. The diesel engine as set forth in claim 1, wherein the diesel engine comprises an exhaust throttle, and wherein the total injection quantity increasing means narrows down an opening degree of the exhaust throttle.

15. The diesel engine as set forth in claim 1, wherein the diesel engine comprises a variable valve timing means, and wherein the total injection quantity increasing means shortened the time of opening both an intake valve and an exhaust valve by the variable valve timing means.

16. The diesel engine as set forth in claim 1, wherein the diesel engine comprises a supercharger having a variable wing means, and wherein the total injection quantity increasing means decreases an opening degree of a variable wing in the variable wing means.

17. The diesel engine as set forth in claim 4, wherein the diesel engine comprises an exhaust sound change avoidance means for controlling the respective injection timings and the respective injection quantities of the injection quantity control arithmetic means so that the exhaust sound is not changed when the injection number reduction avoidance selecting means is canceled.

\* \* \* \* \*